(12) United States Patent
Sohacki et al.

(10) Patent No.: US 12,391,345 B2
(45) Date of Patent: *Aug. 19, 2025

(54) GYROSCOPIC BOAT ROLL STABILIZER WITH BEARING COOLING

(71) Applicant: WaveTamer LLC, Greenville, NC (US)

(72) Inventors: Brian John Sohacki, Livonia, MI (US); Aaron P. Powers, Canton, MI (US); Grady F. Smith, Greenville, NC (US)

(73) Assignee: WAVETAMER LLC, Greenville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/083,792

(22) Filed: Mar. 19, 2025

(65) Prior Publication Data

US 2025/0214686 A1   Jul. 3, 2025

Related U.S. Application Data

(63) Continuation of application No. 18/406,574, filed on Jan. 8, 2024, now Pat. No. 12,269,564, which is a (Continued)

(51) Int. Cl.
*B63B 39/04* (2006.01)
*B63J 3/04* (2006.01)
*F16C 37/00* (2006.01)

(52) U.S. Cl.
CPC .............. *B63B 39/04* (2013.01); *B63J 3/04* (2013.01); *F16C 37/007* (2013.01)

(58) Field of Classification Search
CPC .......... B63B 39/04; B63J 3/04; F16C 37/007; F16C 35/073; F16C 35/077; G01C 19/20
(Continued)

(56) References Cited

U.S. PATENT DOCUMENTS

| 4,069,669 A | 1/1978 | Pitkanen |
| 5,717,263 A | 2/1998 | Cox |

(Continued)

FOREIGN PATENT DOCUMENTS

| CN | 104578595 A | 4/2015 |
| CN | 110198092 A | 9/2019 |

(Continued)

*Primary Examiner* — Daniel V Venne
(74) *Attorney, Agent, or Firm* — COATS & BENNETT, PLLC

(57) ABSTRACT

A gyroscopic roll stabilizer includes an enclosure, a flywheel assembly, a bearing, a motor, and a bearing cooling circuit. The enclosure is mounted to a gimbal for rotation about a gimbal axis and configured to maintain a below-ambient pressure. The flywheel assembly includes a flywheel and flywheel shaft. The bearing rotatably mounts the flywheel assembly inside the enclosure for rotation about a flywheel axis. The bearing has an inner race and an outer race. The inner race is rotationally fixed relative to the flywheel shaft, and the outer race is held rotationally fixed relative to the enclosure. The motor is operative to rotate the flywheel assembly. The bearing cooling circuit is configured to transfer heat away from the bearing by recirculating coolant along a closed fluid pathway. The gyroscopic roll stabilizer is configured to transfer heat away from the inner and/or outer race of the bearing to the coolant.

17 Claims, 11 Drawing Sheets

Related U.S. Application Data continuation of application No. 18/102,456, filed on Jan. 27, 2023, now Pat. No. 11,873,064, which is a continuation of application No. 17/184,988, filed on Feb. 25, 2021, now Pat. No. 11,591,052.

(60) Provisional application No. 63/070,530, filed on Aug. 26, 2020, provisional application No. 62/984,013, filed on Mar. 2, 2020.

(58) Field of Classification Search
USPC .................................................. 114/121, 122
See application file for complete search history.

(56) References Cited

U.S. PATENT DOCUMENTS

| | | | |
|---|---|---|---|
| 5,912,519 | A | 6/1999 | Horner et al. |
| 8,242,649 | B2 | 8/2012 | Fradella |
| 11,050,322 | B2 | 6/2021 | Gieras et al. |
| 11,338,942 | B2 | 5/2022 | Blomquist |
| 11,427,289 | B2 * | 8/2022 | Smith .................... H02K 7/083 |
| 2014/0124172 | A1 | 5/2014 | Veltri et al. |
| 2014/0292120 | A1 | 10/2014 | Kalev |
| 2014/0300224 | A1 | 10/2014 | Kalev |
| 2015/0318758 | A1 | 11/2015 | Kalev et al. |
| 2020/0165010 | A1 | 5/2020 | Sun et al. |

FOREIGN PATENT DOCUMENTS

| | | |
|---|---|---|
| CN | 112510894 A | 3/2021 |
| CN | 112531962 A | 3/2021 |
| CN | 213027712 U | 4/2021 |
| CN | 114448162 A | 5/2022 |
| CN | 114562556 A | 5/2022 |
| DE | 4200824 A1 | 7/1993 |
| EP | 0707754 A1 | 4/1996 |
| WO | 9502271 A1 | 1/1995 |
| WO | 2011100796 A1 | 8/2011 |
| WO | 2020199946 A1 | 4/2019 |
| WO | 2021080437 A1 | 4/2021 |

* cited by examiner

GYROSCOPIC BOAT ROLL STABILIZER WITH BEARING COOLING

RELATED APPLICATIONS

This application is a continuation of U.S. application Ser. No. 18/406,574, filed Jan. 8, 2024, which is a continuation of U.S. application Ser. No. 18/102,456, filed Jan. 27, 2023, now U.S. Pat. No. 11,873,064, which is a continuation of U.S. application Ser. No. 17/184,988, filed Feb. 25, 2021, now U.S. Pat. No. 11,591,052, which claims benefit of U.S. Provisional Application No. 63/070,530, filed Aug. 26, 2020, and U.S. Provisional Application No. 62/984,013, filed Mar. 2, 2020, the disclosures of each of which are incorporated herein by reference in their entirety.

TECHNICAL FIELD

The present disclosure relates generally to boat roll stabilizers for reducing the sideways rolling motion of a boat and, more particularly, to controlled moment gyroscopes for reducing the roll of a boat based on the gyroscopic effect.

BACKGROUND

The sideways rolling motion of a boat can create safety problems for passengers and crew on boats, as well as cause discomfort to passengers not accustomed to the rolling motion of the boat. A number of technologies currently exist to reduce the sideways rolling motion of a boat. One technology currently in use is active fin stabilization. Stabilizer fins are attached to the hull of the boat beneath the waterline and generate lift to reduce the roll of the boat due to wind or waves. In the case of active fin stabilization, the motion of the boat is sensed and the angle of the fin is controlled based on the motion of the boat to generate a force to counteract the roll. Fin stabilization is most commonly used on large boats and is effective when the boat is underway. Fin stabilization technology is not used frequently in smaller boats and is generally not effective when the boat is at rest. Stabilizer fins also add to the drag of the hull and are susceptible to damage.

Gyroscopic boat stabilization is another technology for roll suppression that is based on the gyroscopic effect. A control moment gyroscope (CMG) is mounted in the boat and generates a torque that can be used to counteract the rolling motion of the boat. The CMG includes a flywheel that spins at a high speed. A controller senses the attitude of the boat and uses the energy stored in the flywheel to "correct" the attitude of the boat by applying a torque to the hull counteracting the rolling motion of the boat. CMGs work not only when a boat is underway, but also when the boat is at rest. CMGs are also typically less expensive than stabilizer fins, do not add to the drag of the hull, and are not exposed to risk of damage from external impacts.

Although, CMGs are gaining in popularity, particularly for smaller fishing boats and yachts, this technology has some limitations. The energy used to counteract the rolling motion of the boat comes from the angular momentum of the rotation of the flywheel at a high rate of speed. Consequently, heat builds up in the bearings supporting the flywheel and bearing failure can result if the operational temperature of the bearings is exceeded. The flywheel is typically mounted inside an enclosure for safety reasons. In order to obtain the high spin rate, the flywheel is typically contained in a vacuum enclosure, which makes heat dissipation problematic.

Another problem with existing CMGs is that it takes a significant amount of time for the flywheel to "spin up," i.e., to obtain its desired operating speed. In some CMGs currently on the market, it can take as long as seventy minutes before the CMG is ready for use. The long "spin up" period means that the CMG cannot be used for trips of short duration, which comprises a majority of boating occasions.

Thus, there remains a need for alternative approaches to gyroscopic boat stabilization, advantageously approaches that allow for better cooling of the bearings, so that performance can be improved.

SUMMARY

The present disclosure relates to a gyroscopic roll stabilizer for a boat. In an aspect, the gyroscopic roll stabilizer includes an enclosure mounted to a gimbal and configured to maintain a below-ambient pressure, a flywheel assembly including a flywheel and flywheel shaft, one or more bearings for rotatably mounting the flywheel assembly inside the enclosure, a motor for rotating the flywheel, and a bearing cooling system for cooling the bearings supporting the flywheel. In one embodiment, the bearing cooling system comprises a heat sink that is disposed within a cavity formed within the end of the flywheel shaft. Heat is transferred from the flywheel shaft to the heat sink and then by solid and/or liquid conduction to the heat exchanger. In another embodiment, cooling is achieved by delivering a liquid coolant into a tapered cavity in the end of the flywheel shaft. The cavity is shaped so that the centrifugal force causes the liquid coolant to flow towards the open end of the shaft, where the liquid coolant is collected by a fluid collection system.

In another aspect, a gyroscopic roll stabilizer for a boat is disclosed. The gyroscopic stabilizer includes an enclosure, a flywheel assembly, a first bearing, a bearing block, a motor, and a bearing cooling circuit. The enclosure is mounted to a gimbal for rotation about a gimbal axis and configured to maintain a below-ambient pressure. The flywheel assembly includes a flywheel and flywheel shaft. The first bearing rotatably mounts the flywheel assembly inside the enclosure for rotation about a flywheel axis. The first bearing has an inner race and an outer race, the inner race affixed to the flywheel shaft. The bearing block is disposed between the outer race of the first bearing and the enclosure and configured to hold the outer race rotationally fixed relative to the enclosure. The motor is operative to rotate the flywheel assembly. The bearing cooling circuit is configured to transfer heat away from the outer race of the first bearing. The bearing cooling circuit has a closed fluid pathway for recirculating cooling fluid therein. The fluid pathway includes a fluid channel disposed between the bearing block and the enclosure and having the cooling fluid therein. The gyroscopic roll stabilizer is configured to transfer heat away from the outer race of the first bearing to the bearing block, and from the bearing block to the cooling fluid.

In another aspect, a method of operating a gyroscopic roll stabilizer for a boat is disclosed. The method includes 1) maintaining a below ambient pressure within an enclosure surrounding a flywheel assembly, the flywheel assembly including a flywheel shaft and a spinning flywheel; 2) supporting the spinning flywheel for rotation about a flywheel axis via a bearing, the bearing comprising an inner race and an outer race, the inner race affixed to the flywheel shaft; 3) supporting the outer race via a bearing block disposed between the outer race and the enclosure and configured to hold the outer race rotationally fixed relative to the enclosure; 4) dissipating heat from the outer race by transferring the heat by conduction and convection to a cooling fluid flowing through a fluid channel disposed between the bearing block and the enclosure; 5) cooling the cooling fluid by removing heat from the cooling fluid external to the portion of the enclosure maintained at the below-ambient pressure; and 6) recirculating the cooling fluid through a closed fluid pathway that includes the fluid channel.

In another aspect, another gyroscopic roll stabilizer for a boat is disclosed. The gyroscopic stabilizer includes an enclosure, a flywheel assembly, a first bearing, a motor, and a bearing cooling circuit. The enclosure is mounted to a gimbal for rotation about a gimbal axis and configured to maintain a below-ambient pressure. The flywheel assembly includes a flywheel and flywheel shaft, with an open-ended cavity formed in an end of the flywheel shaft. The first bearing rotatably mounts the flywheel assembly inside the enclosure for rotation about a flywheel axis. The first bearing has an inner race affixed to the flywheel shaft proximate the cavity and an outer race rotationally fixed relative to the enclosure. The motor is operative to rotate the flywheel assembly. A liquid heat transfer medium is disposed in the cavity. The bearing cooling circuit is configured to transfer heat away from the inner race of the first bearing by recirculating a cooling fluid. The bearing cooling circuit includes a heat transfer shaft assembly and a closed fluid pathway. The heat transfer shaft assembly is rotationally fixed relative to the flywheel axis and extends from the enclosure into the cavity so as to contact the liquid heat transfer medium. The closed fluid pathway for the cooling fluid extends through the heat transfer shaft assembly to internally cool the heat transfer shaft assembly. The gyroscopic roll stabilizer is configured to transfer heat away from the inner race of the first bearing to the flywheel shaft, and from the flywheel shaft to the liquid heat transfer medium, and from the liquid heat transfer medium to the heat transfer shaft assembly, and from the heat transfer shaft assembly to the cooling fluid.

In another aspect, a method of operating a gyroscopic roll stabilizer for a boat is disclosed. The method includes 1) maintaining a below ambient pressure within an enclosure surrounding a flywheel assembly, the flywheel assembly including a flywheel shaft and a spinning flywheel; wherein the flywheel shaft has an open-ended cavity formed in an end of the flywheel shaft; wherein a liquid heat transfer medium is disposed in the cavity; 2) supporting the spinning flywheel for rotation about a flywheel axis via a bearing, the bearing comprising an inner race and an outer race, the inner race affixed to the flywheel shaft; 3) dissipating heat from the inner race by transferring the heat by conduction and convection to a bearing cooling circuit configured to transfer heat by recirculating a cooling fluid along a closed fluid pathway; 4) cooling the cooling fluid by removing heat from the cooling fluid external to the portion of the enclosure maintained at the below-ambient pressure; and 5) recirculating the cooling fluid through the closed fluid pathway. The dissipating heat comprises internally cooling, by the cooling fluid, a heat transfer shaft assembly rotationally fixed relative to the flywheel axis and extending from the enclosure into the cavity so as to contact the liquid heat transfer medium. In the method, heat is transferred away from the inner race of the bearing to the flywheel shaft, and from the flywheel shaft to the liquid heat transfer medium, and from the liquid heat transfer medium to the heat transfer shaft assembly, and from the heat transfer shaft assembly to the cooling fluid.

The features, functions and advantages that have been discussed above, and/or are discussed below, can be achieved independently in various aspects or may be combined in yet other aspects, further details of which can be seen with reference to the following description and the drawings.

DETAILED DESCRIPTION

Figure 1A:
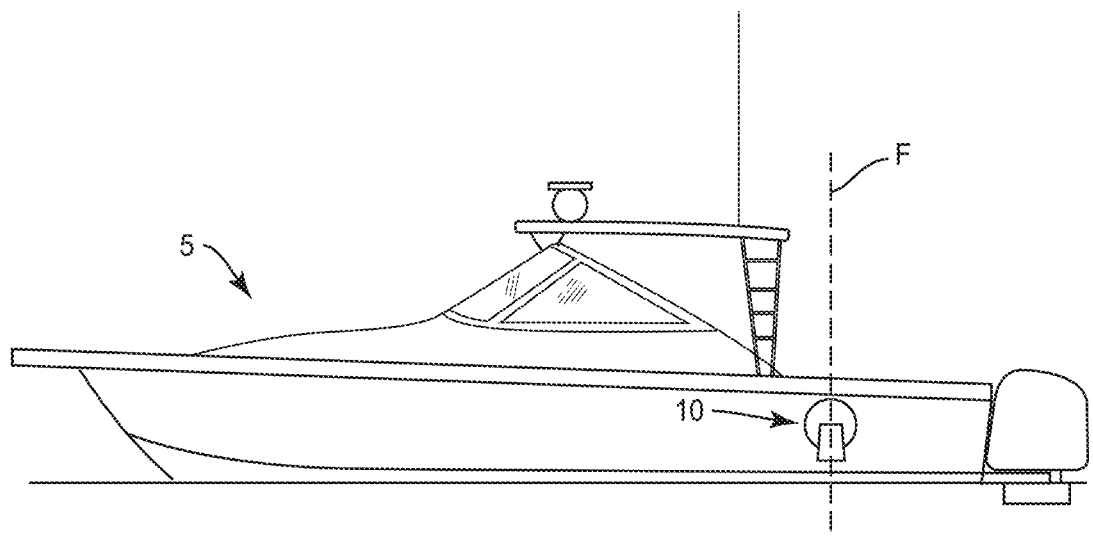
FIGS. 1A and 1B illustrate a boat equipped with a CMG as herein described.
Figure 1B:
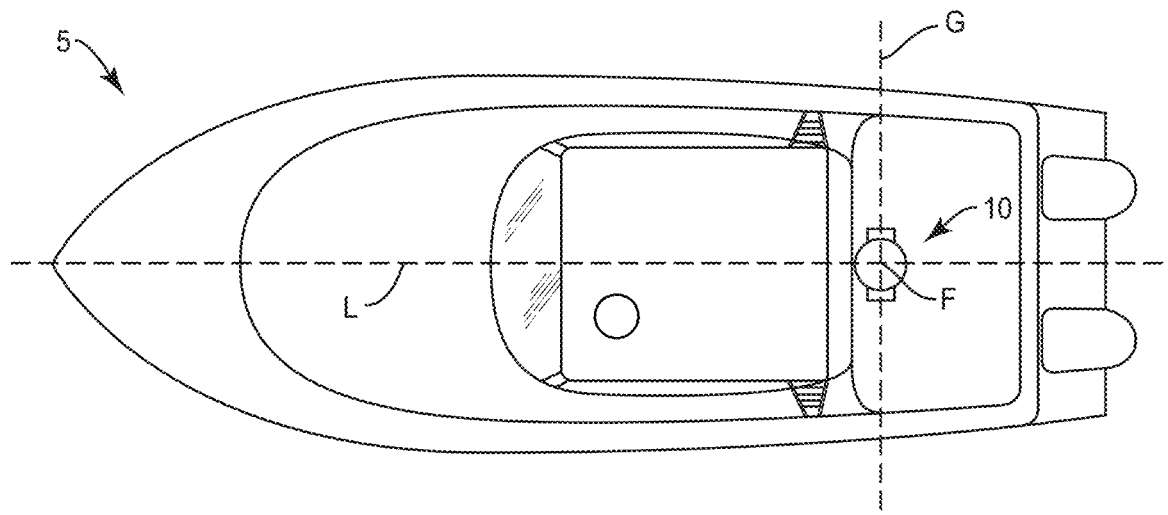

Referring now to the drawings, FIGS. 1A and 1B illustrate a control moment gyroscope (CMG) 10 mounted in a boat 5 for roll stabilization. Multiple embodiments of the CMG 10 are described. For convenience, similar reference numbers are used in the following description of the embodiments to indicate similar elements in each of the embodiments.

Figure 2:
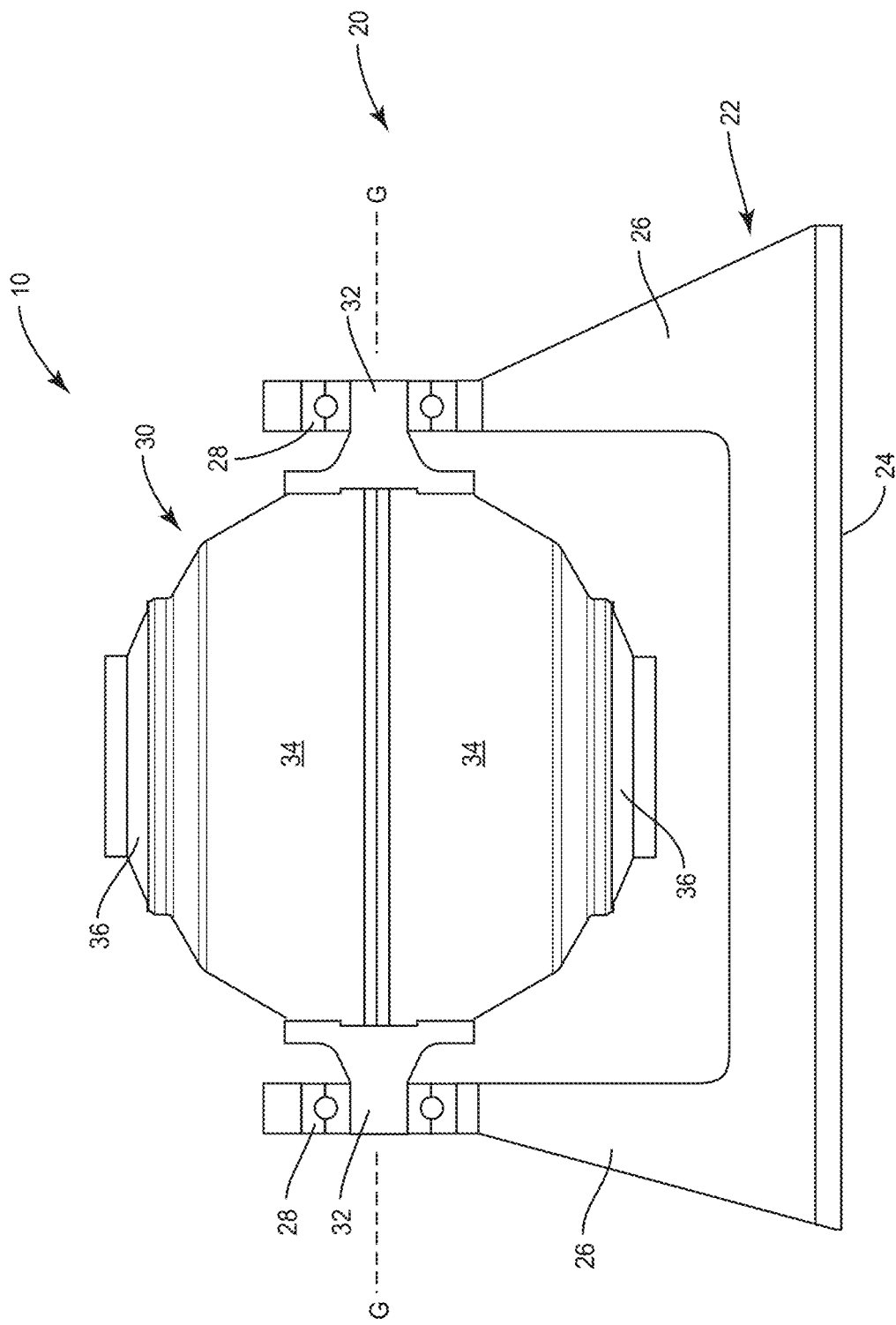
FIG. 2 show an elevation view of a CMG configured as a boat roll stabilizer according to an embodiment.
Figure 3:
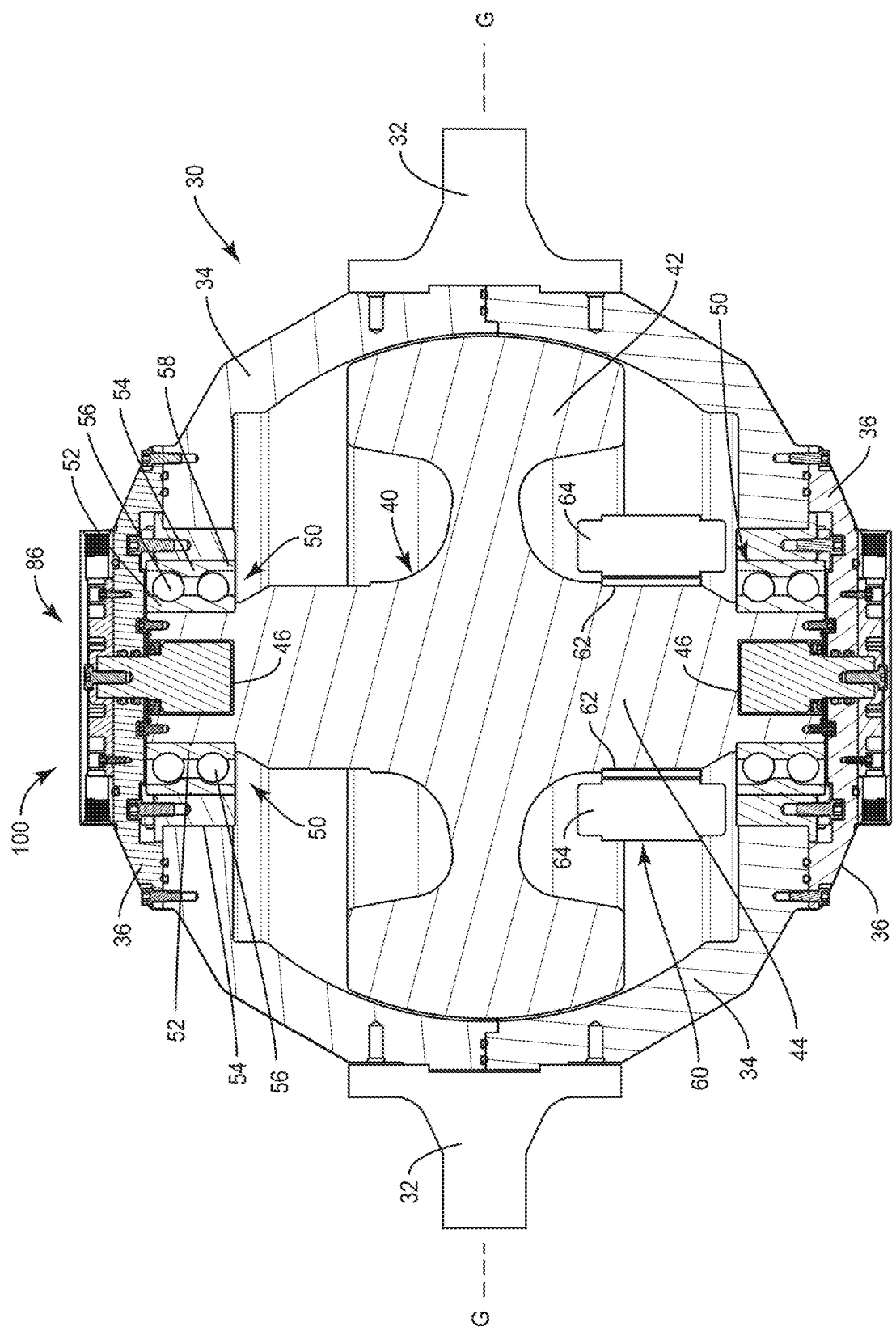
FIG. 3 shows a section view through the enclosure of a CMG according to an embodiment.

Referring now to FIGS. 2 and 3, the main functional elements of the CMG 10 comprise a single-axis gimbal 20, an enclosure 30 mounted to the gimbal 20 for rotation about a gimbal axis G, a flywheel assembly 40 mounted by bearings 50 inside the enclosure, a motor 60 (FIG. 5) to rotate the flywheel assembly 40, and a torque control system 70 (FIG. 5) to control precession of the flywheel assembly 40, with the energy of the flywheel assembly 40 transferred to the hull of the boat 5 to counteract rolling motions. Each of the embodiments further comprises a bearing cooling system 100 to cool the flywheel bearings 50. Various designs of the bearing cooling system 100 are disclosed.

The gimbal 20 comprises a support frame 22 that is configured to be securely mounted in the boat 5. Preferably, the gimbal 20 is mounted along a longitudinal axis L of the boat 5 with the gimbal axis G extending transverse to the longitudinal axis L. Conventionally, the gimbal 20 is mounted in the hull of the boat 5, but could be mounted at any location. The support frame 22 of the gimbal 20 comprises a base 24 and two spaced-apart supports 26. A bearing 28 is mounted on each support 26 for rotatably mounting the enclosure 30 to the supports 26. For this purpose, the enclosure 30 includes two gimbal shafts 32 projecting from diametrically opposed sides of the enclosure 30. The gimbal shafts 32 are rotatably journaled in the gimbal bearings 28 to allow the enclosure 30 (and flywheel assembly 40 disposed therein) to rotate or precess about the gimbal axis G in the fore and aft directions.

The basic elements of enclosure 30 are the same in the various embodiments described herein but vary in some details depending on the design of the bearing cooling system 100. The enclosure 30 is advantageously generally spherical in form and comprises two main housing sections 34 and two cover plates 36. The two main housing sections 34 join along a plane that typically bisects the spherical enclosure 30. The cover plates 36 join the main housing sections 34 along respective planes closer to the "poles" of the spherical enclosure 30. All joints in the enclosure 30 are sealed to maintain a below-ambient pressure within the enclosure 30 to reduce aerodynamic drag on the flywheel assembly 40. Typical below-ambient pressures should be in the range of 1-40 torr (133-5333 Pa, 0.02-0.77 psi). Although the construction of the enclosure 30 is generally the same in the embodiments herein described, the details of the housing sections 34 and cover plates 36 vary as described more fully below depending on the design of the bearing cooling system 100 used.

Referring to FIG. 3, the flywheel assembly 40 conceptually comprises a flywheel 42 and flywheel shaft 44 that is mounted for rotation inside the enclosure 30 of the gimbal 20 so that the axis of rotation F of the flywheel assembly 40 is perpendicular to the gimbal axis G. Thus, when the boat 5 is level such that gimbal axis G is horizontal, the axis of rotation F of the flywheel shaft 44 will be in the vertical direction, typically perpendicular to the deck of the boat. The flywheel 42 and shaft 44 may be formed as a unitary piece, or may comprise two separate components. In one exemplary embodiment, the diameter and the flywheel 42 is approximately 20.5 inches; the flywheel assembly 40 has a total weight of about 614 pounds; and the flywheel assembly 40 has a moment of inertia of about 32,273 lbm in$^2$. When rotated at a rate of 9000 rpm, the angular momentum of the flywheel assembly 40 is about 211,225 lbm ft$^2$/s.

The flywheel assembly 40 is supported by upper and lower bearing assemblies inside the enclosure 30. Each bearing assembly comprises a bearing 50 mounted within a bearing block 58. Each bearing 50 comprises an inner race 52 that is affixed to and rotates with the flywheel shaft 44, an outer race 54 that is mounted inside the bearing block 58, and one or more ball bearings 56 disposed between the inner and outer races 52, 54. The bearing blocks 58 are secured to the interior of the enclosure 30. Seals (not shown) may advantageously be disposed on the top and bottom of the bearings 50 to contain lubricant in the bearings 50.

The motor 60 rotates the flywheel assembly 40 at a high rate of speed (e.g., 9000 rpm). The motor 60 includes a rotor 62 that connects to the flywheel shaft 44 and a stator 64 that this secured to the enclosure 30 by any suitable mounting system. Although the motor 60 is advantageously mounted inside the enclosure 30, it is also possible to mount the motor 60 on the exterior of the enclosure 30. In one embodiment, the motor 60 operates on 230 Volt single phase AC power (or could be three-phase AC power, or AC or DC battery power, such as from a lithium ion battery pack) and is able to accelerate a flywheel assembly with a moment of inertia of about 32,273 lbm in$^2$ from rest to a rotational speed of 9000 rpm preferably in about 30 minutes or less for an average acceleration of about 5 rpm/s, and more preferably in about 20 minutes or less for an average acceleration of about 7.75 rpm/s, and even more preferably in about 10 minutes or less for an average acceleration of about 15 rpm/s (or 1.57 radians/s$^2$).

Figure 5:
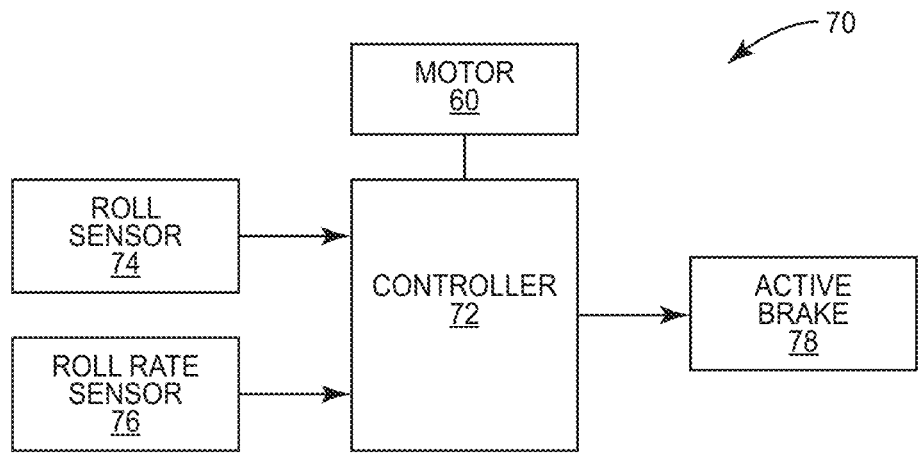
FIG. 5 shows a cooling circuit for a CMG.

The torque control system 70, shown in FIG. 5, controls the rate of precession of the flywheel assembly 40 about the gimbal axis G. The rolling motion of a boat 5 caused by wave action can be characterized by a roll angle and roll rate. The rolling motion causes the flywheel 42 to precess about the gimbal axis G. Sensors 74, 76 measure the roll angle and roll rate respectively, which are fed to a controller 72. The controller 72 generates control signals to control an active braking system or other torque applying device 78 that controls the rate of precession of the flywheel assembly 40. By controlling the rate of precession, the flywheel assembly 40 generates a torque in opposition to the rolling motion. This torque is transferred through the gimbal 20 to the boat 5 to dampen the roll of the boat 5. An example of the active braking system 78 is described in U.S. Patent Application Publication No. US20200317308.

When the flywheel assembly 40 rotates at high speed, the bearings 50 and motor 60 will generate a substantial amount of heat, which could lead to bearing and/or motor failure. Conventional air and liquid cooling techniques are not suitable for bearings 50 or other heat generating components contained within a vacuum or significantly below ambient pressure environment. Various embodiments of the bearing cooling system 100 are disclosed herein allow cooling of bearings 50 and optionally other heat generating components contained within the enclosure 30 without direct contact of the recirculated liquid coolant with the bearings 50 or other moving heat generating components, which would result in high frictional losses. In general, heat is transferred by solid and/or liquid conduction to a heat sink that is cooled by oil, glycol, or other liquid coolant. Liquid cooling enables more heat to be dissipated compared to air cooling or gaseous convection and conduction. Reliance on gaseous convection and conduction in existing CMGs imposes limitations on the amount of heat that can be dissipated because the interior of the enclosure 30 is typically maintained at a below ambient pressure. The limited heat transfer capacity in conventional CMGs imposes limitations on the size of the electric motor that is used, which in turn extends the time required to engage and use the conventional CMG. Because the electric motor in conventional CMGs is undersized to avoid heat generation, conventional CMGs require significant time to accelerate the flywheel assembly 40 to a speed that provides the desired counter-torque and roll stabilization. Providing more efficient cooling of the bearings 50 as herein described enables use of a larger and more powerful motor 60 and faster acceleration of the flywheel assembly 40 so that the benefits of using the CMG 10 can be obtained in significantly shorter time periods.

Figure 6:
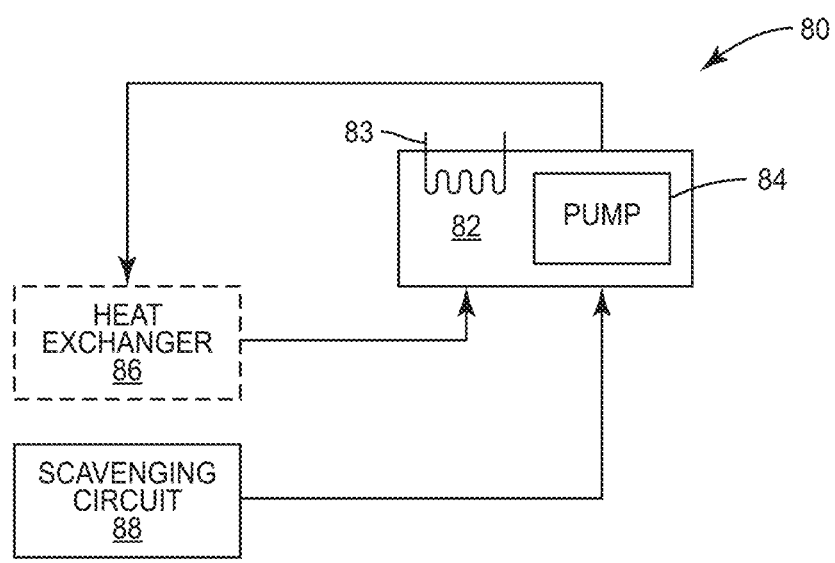
FIG. 6 shows a torque control system for the CMG.

FIG. 6 is a schematic diagram of a cooling circuit 80 for circulating the liquid coolant. A fluid reservoir 82 contains the liquid coolant which is circulated in a "closed" circuit by a fluid pump 84. The fluid reservoir 82 may include a heat exchanger 83 to cool the liquid coolant in the fluid reservoir 82. After leaving the fluid reservoir 82, the liquid coolant passes through the heat exchanger 86 where it adsorbs and carries away heat generated by the bearings 50, as described more fully below. In some embodiments, heat is transferred from the flywheel shaft 44 to a heat sink and then by solid and liquid conduction to the heat exchanger 86. In other embodiments, heat is transferred from the flywheel shaft 44 to the liquid coolant which is circulated through a cavity 46 in the flywheel shaft 44. Accordingly, the heat transfer to the liquid coolant occurs within the cavity 46 of the flywheel shaft 44 so the heat exchanger 86 is not required. In some embodiments, a scavenging circuit 88 is provided to collect liquid coolant that may seep into the interior of the enclosure 30 and return the liquid coolant to the fluid reservoir 82.

Figure 4:
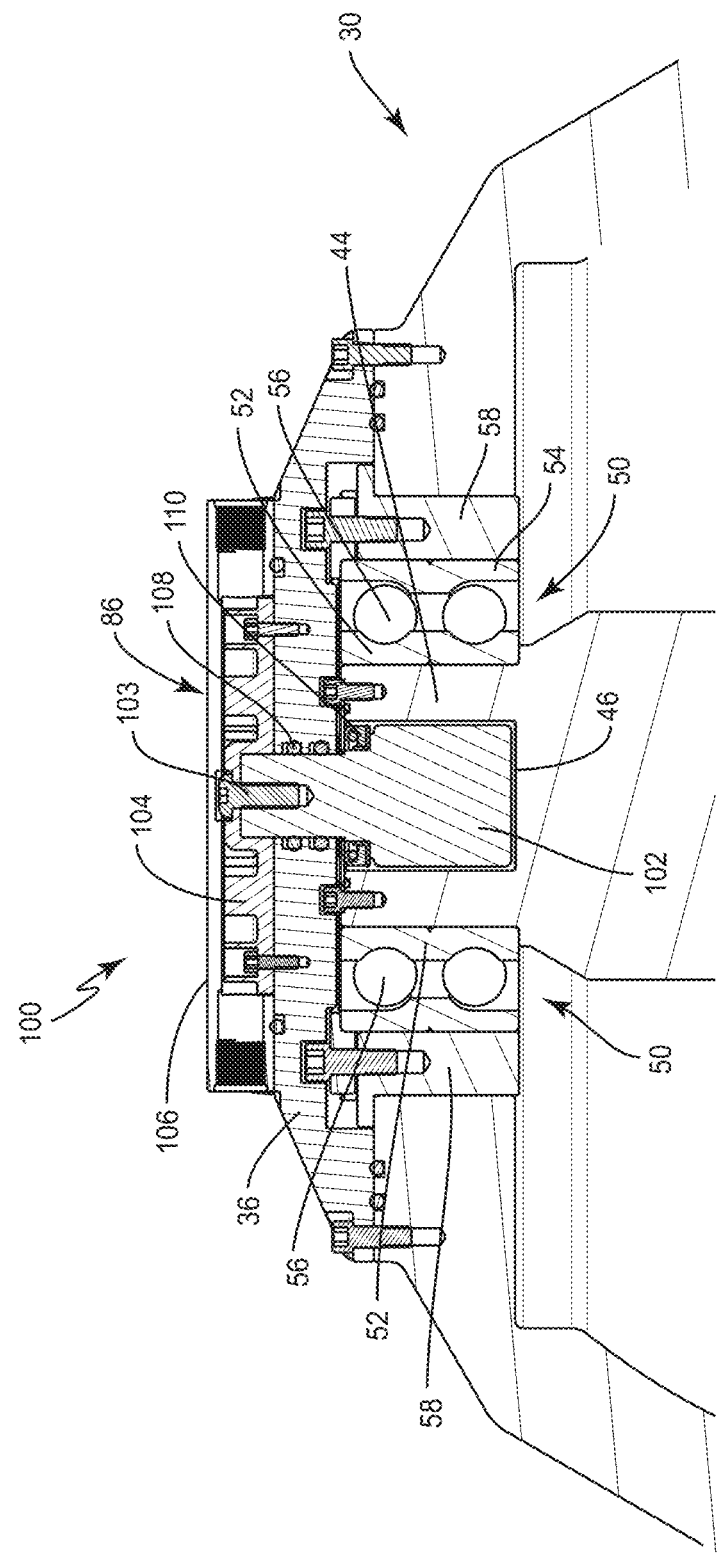
FIG. 4 shows a partial section view of FIG. 3.

FIG. 4 illustrates one embodiment of a bearing cooling system 100 using a heat sink to dissipate heat generated by the bearings 50 and/or motor 60. While the present discussion of the bearing cooling system 100 is generally in the context of cooling the upper bearing 50, it should be noted that the upper and lower bearings 50 may be cooled in similar ways, if desired. For the upper bearing 50, the upper portion of the flywheel shaft 44 is secured within bearing 50 that is, in turn, secured within the enclosure 30. Each bearing 50 includes an outer race 54, one or more ball bearings 56, and an inner race 52 that engages the flywheel shaft 44 and rotates therewith. The flywheel shaft 44 includes a cavity 46 at each end thereof. The cavity 46 in each end of the flywheel shaft 44 is open at one end and includes a side wall and a bottom wall (opposite the opening of the cavity 46).

A heat transfer member 102 that functions as a heat sink is suspended in the cavity 46. The heat transfer member 102 does not directly engage the side or bottom walls of the cavity 46. Rather, the outer surface of the heat transfer member 102 is spaced from the side and bottom walls of the cavity 46. In one embodiment, the spacing between the heat transfer member 102 and the walls of the cavity 46 is approximately 0.035-0.095 inches. Various materials can be used for the heat transfer member 102 discussed herein. Preferably, copper, aluminum, or alloys thereof are used because of their relatively high thermal conductivity.

A heat transfer medium is contained in the gap between the heat transfer member 102 and the walls of the cavity 46. As one example, the heat transfer medium comprises a low vapor pressure fluid that is suitable for the low pressure environment in the enclosure 30. A low vapor pressure fluid is a liquid, such as oil, that has a relatively low boiling point compared to water and is suitable for employment in a vacuum environment. For example, aerospace lubricants, such as perfluoropolyether (PFPE) lubricants, designed for vacuum environments can be used as the heat transfer medium. The low vapor pressure fluid enables transfer of heat from the flywheel shaft 44 to the heat transfer member 102 by liquid conduction and liquid convection. A labyrinth seal 110 extends around the heat transfer member 102 and effectively seals the cavity 46 such that the heat transfer medium is maintained within the cavity 46. The labyrinth seal 110 is preferably fixed to the heat transfer member 102, which means that the flywheel shaft 44 rotates around the labyrinth seal 110.

As seen in FIG. 4, heat transfer member 102 extends from cavity 46, through an opening in a cover plate 36 forming a part of the enclosure 30, and into a heat exchanger 86. Seals 108 located in corresponding grooves in the cover plate 36 maintain vacuum within the enclosure 30. The heat exchanger 86 is mounted to the exterior surface of the cover plate 36. The heat exchanger 86 comprises a housing 106 and a heat exchange plate 104 confined within the housing 106. The heat transfer member 102 is secured by a fastener 103 to the heat exchange plate 104 so that the heat transfer member 102 is effectively suspended in the cavity 46 formed in the flywheel shaft 44. More particularly, the heat exchange plate 104 includes a recess in the bottom surface thereof that receives the end of the of the heat transfer member 102. The surface contact between the end of the heat transfer member 102 and the heat exchange plate 104 facilitates the efficient transfer of heat by solid conduction from the heat transfer member 102 to the heat exchange plate 104.

A liquid coolant, such as a glycol coolant, is circulated through the heat exchanger 86 to absorb and carry heat away from the heat exchange plate 104. The upper surface of the heat exchange plate 104 can be provided with fluid channels and/or cooling fins to increase the surface area of the heat exchange plate 104 and to facilitate heat transfer from the heat exchange plate 104 to the liquid coolant.

Heat is generated in the inner and outer races of the bearing assemblies 50 due to the high side loads generated from the CMG's torque as the enclosure 30 rotates about the gimbal axis G. The outer race 54 has a continuous heat conductive path through the enclosure 30 which permits the heat associated with the outer race 54 to be conveyed into the atmosphere. The inner race 52 requires a heat sink path through parts of the enclosure 30. In this embodiment, heat from the inner race 52 of the bearing assembly 50 is transferred by solid conduction to the flywheel shaft 44. The heat is then transferred by liquid conduction from the flywheel shaft 44 to the heat transfer member 102, and by solid conduction through the heat transfer member 102 to the heat exchange plate 104 that continuously conveys the heat into surrounding liquid coolant. In some embodiments, the heat exchanger 86 could employ air or gas cooling rather than liquid cooling.

Figure 7:
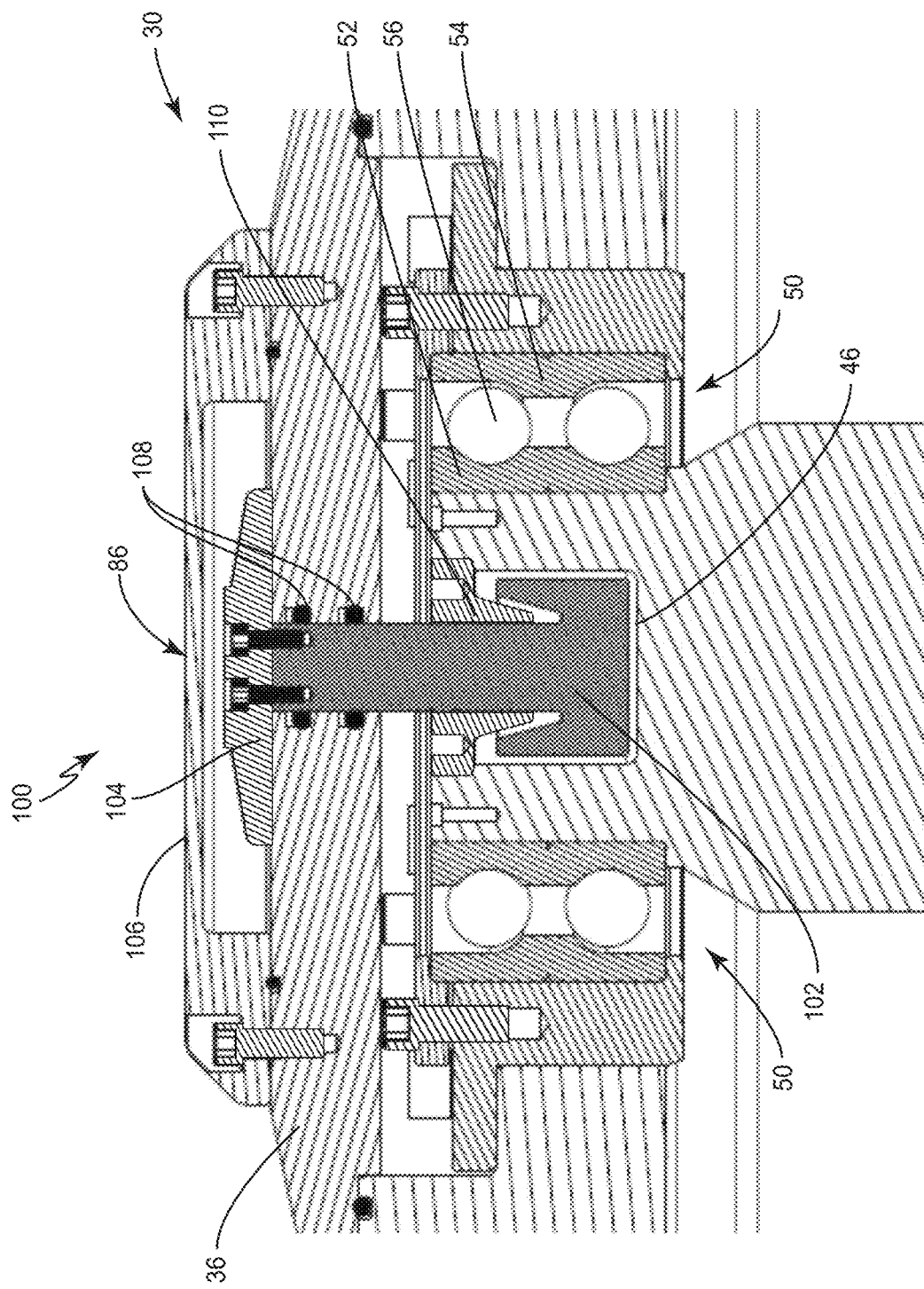
FIG. 7 shows a partial section view illustrating the bearing cooling system according to another embodiment.

FIG. 7 illustrates an alternate bearing cooling system 100 that also uses a heat sink. This bearing cooling system 100 in FIG. 7 is similar to the design shown in FIG. 4. The main differences lie in the shapes of the heat transfer member 102, labyrinth seal 110, and the heat exchange plate 104. In this embodiment, the heat transfer member 102 includes a channel that increases the surface area exposed to the heat transfer medium. The heat exchange plate 104, in contrast to the previous embodiment, has a smooth top surface without grooves or vanes. The heat transfer path, however, is conceptually similar. That is, heat associated with the inner race 52 is transferred to the flywheel shaft 44 by solid conduction. The cavity 46 formed in the flywheel shaft 44, like the above design (FIG. 4), is configured to hold the heat transfer medium (typically a low vapor pressure fluid) so that heat is transferred by liquid conduction from the flywheel shaft 44 through the heat transfer medium to the lower portion of a heat transfer member 102. Thereafter, heat in the heat transfer member 102 is transferred by solid conduction to the heat exchange plate 104. A liquid coolant is circulated through the heat exchanger 86. In doing so, the liquid coolant contacts the heat exchange plate 104 and heat associated with the heat exchange plate 104 is transferred to the circulating liquid coolant.

Figure 8:
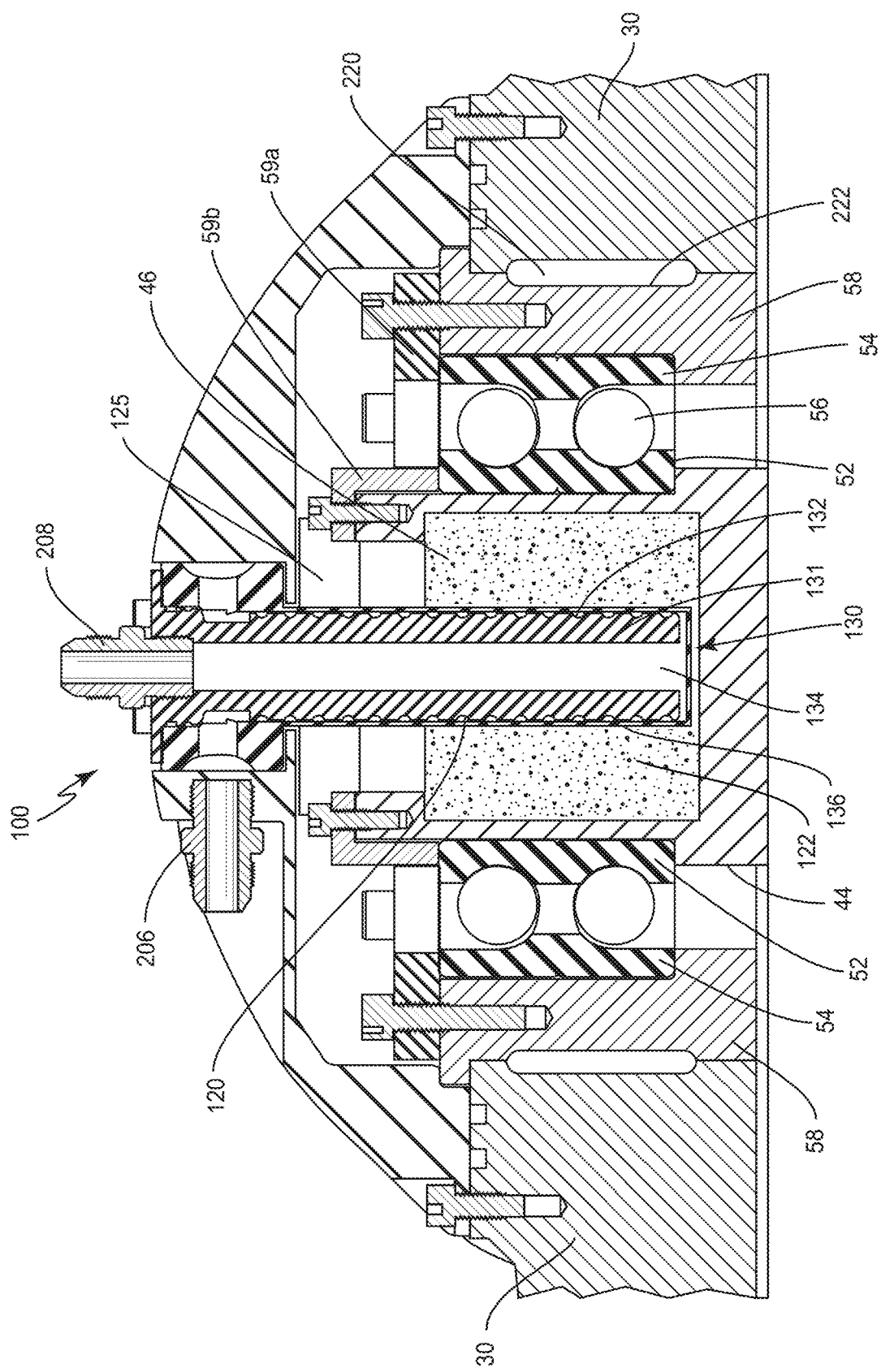
FIG. 8 shows a partial section view illustrating a CMG with both an inner race bearing cooling circuit and an outer race bearing cooling circuit.
Figure 9:
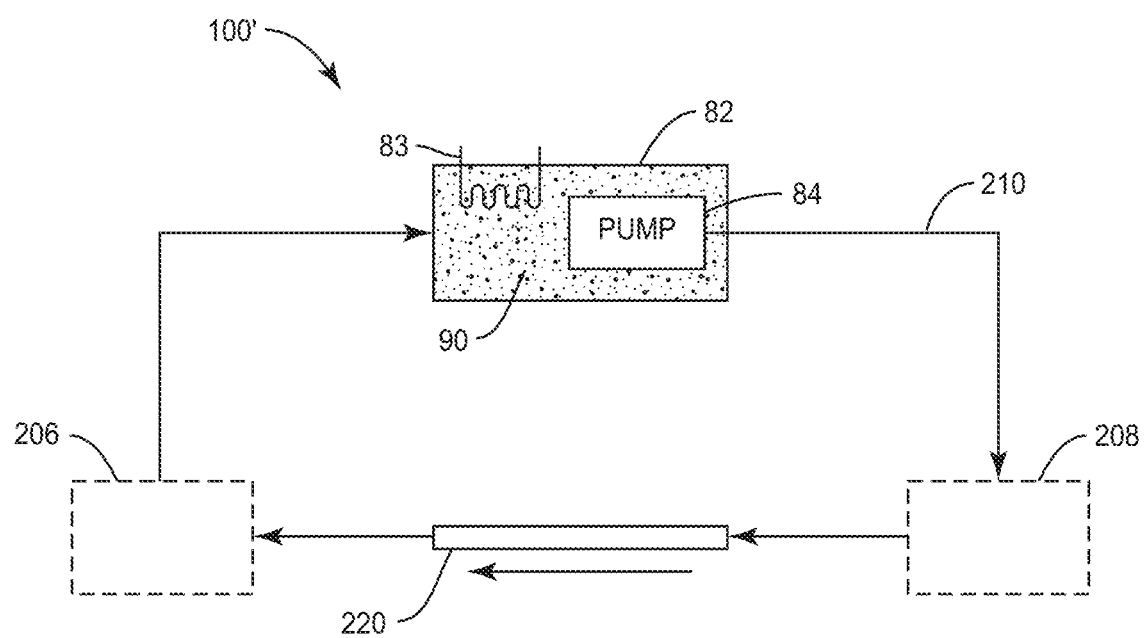
FIG. 9 shows a simplified schematic of a bearing cooling circuit for cooling the outer race.

FIG. 8 is another alternative design for a bearing cooling system 100 for a gyroscopic boat stabilizer (e.g., CMG 10). This design is similar in concept to the preceding designs but differs in a number of respects. For example, the bearing cooling system 100 of FIG. 8 has an optional bearing cooling circuit 100' (see FIG. 9) for the outer race 54 of the bearing. As another example, the bearing cooling system 100 of FIG. 8 has a heat transfer shaft assembly 130 that extends into the cavity 46 of the flywheel shaft 44, and that is internally cooled. Except where noted below, the basic design of the gimbal 20, enclosure 30, flywheel assembly 40, bearing assemblies 50 and motor 60 (FIG. 5) of the CMG 10 shown in FIG. 8 are essentially the same as previously described. Therefore, the following description will not reiterate the details of these elements.

Referring to FIG. 8, the CMG 10 includes an enclosure 30, a flywheel assembly 40, a bearing 50, a bearing block 58, a motor 60, and a bearing cooling circuit. The portions of the enclosure 30, flywheel assembly 40, and motor 60 (not shown in FIG. 8) are similar to that discussed above, and only briefly discussed herein for clarity. As discussed above, the enclosure 30 is mounted to the gimbal 20 for rotation about the gimbal axis G, and is configured to maintain a below-ambient pressure inside the enclosure 30. The flywheel assembly 40 is rotatably mounted in the enclosure 30, and includes flywheel 42 and flywheel shaft 44. The flywheel assembly 40 is rotatably mounted inside the enclosure 30 for rotation about flywheel axis F. While the flywheel assembly 40 is advantageously rotatably mounted in the enclosure 30 by at least two bearings 50 disposed towards opposing "poles" of the flywheel assembly 40, in some versions the flywheel assembly 40 is rotatably mounted by one bearing 50. The cooling of the upper bearing 50 (typically located generally opposite the motor 60) will be discussed, it being understood that other bearings 50, if present, are advantageously cooled by similar corresponding bearing cooling circuits, or sub-portions of a bearing cooling circuit.

As is conventional, the bearing includes inner race 52 and outer race 54. The inner race 52 is affixed to the flywheel shaft 44 so that the inner race 52 rotates with the flywheel shaft 44. The outer race 54 is mounted to a bearing block 58, and the bearing block 58 is mounted to the enclosure 30, so that the outer race 54 is rotationally fixed relative to the enclosure 30. The mounting of the bearing block 58 to the enclosure 30 may be via any suitable means, such as by suitable lip(s) in the bearing block 58 and one or more bearing cap plates 59a held by screws. Likewise, the affixing of the inner race 52 to the flywheel shaft 44 may be by any suitable means, such as press fitting, and/or suitable lip(s) in the flywheel shaft 44 and one or more bearing cap plates 59b held by screws. The bearing block 58 may be generally round in cross-section (perpendicular to flywheel axis F), but this is not required and any suitable shape may be employed, including faceted shapes.

A bearing cooling circuit 100' is used to transfer heat away from the outer race 54. See FIG. 9. The bearing cooling circuit 100' includes a fluid pathway 210 that is closed, and is sometimes referred to as the closed fluid pathway 210. The fluid pathway 210 is used for recirculating cooling fluid 90, with the cooling fluid 90 being used as part of the heat dissipation mechanism for removing heat from the outer race 54. The cooling fluid 90 may be any suitable fluid, with a liquid such as glycol and/or glycol mixtures being particular examples. The fluid pathway 210 includes a fluid channel 220 disposed near the outer race 54 and between the bearing block 58 and the enclosure 30. The fluid channel 220 has cooling fluid 90 therein. The fluid channel 220 is advantageously jointly defined by the bearing block 58 and the enclosure 30. For example, the bearing block 58 may include one or more grooves 222 on its outer surface. Such groove(s) 222 are conceptually closed off, to form the fluid channel 220, by the inner wall of enclosure 30 facing the bearing block 58. Alternatively and/or additionally, the enclosure 30 may include one or more grooves 222 on an inner surface that faces the bearing block 58. Such groove(s) 222 are conceptually closed off, to form the fluid channel 220, by the outer surface of the bearing block 58 facing the enclosure 30. Note that the groove(s) 222 may be oriented perpendicular to the flywheel axis F, or may advantageously spiral around the flywheel axis F, such as by being helical or other spiral shape. Alternatively, the groove(s) 222 may wind around the interface of the bearing block 58 and the enclosure 30 in any suitable fashion, such as in a sinusoidal shape, or a zig-zag shape, whether regular or irregular. Optionally, the fluid pathway 210 peripherally surrounds the flywheel axis F, such as by circumnavigating the bearing block 58. The flow direction in the fluid pathway 210 may be in any suitable direction, such as clockwise or counter-clockwise, or both as appropriate. When the fluid channel 220 is spiral (e.g., helical), the cooling fluid 90 advantageously flows through the fluid channel 220 spirally (e.g., helically) either outward away from the flywheel 42, or inward toward flywheel 42.

The bearing cooling circuit 100' optionally also includes a reservoir 82 for the cooling fluid 90 flowing through the cooling circuit 100', and a fluid pump 84 operative to recirculate the cooling fluid 90 through bearing cooling circuit 100'. Thus, the fluid pathway 210 for the cooling fluid 90 optionally extends through the fluid reservoir 82, the fluid channel 220, and the fluid pump 84. Thus, the pump 84 is operatively connected to the fluid channel 220 and configured to recirculate the cooling fluid 90 through the fluid channel 220 to remove heat from the outer race 54 via the bearing block 58. The presence of the bearing cooling circuit 100' in the gyroscopic roll stabilizer allows the gyroscopic roll stabilizer to be configured to transfer heat away from the outer race 54 to the bearing block 58, and from the bearing block 58 to the cooling fluid 90. Note that a heat exchanger, such as heat exchanger 83, is operatively connected to closed fluid pathway 210 and configured to remove heat from the cooling fluid 90 to ambient after the cooling fluid 90 has passed through the fluid channel 220.

In some aspects, the fluid pathway 210 also includes an inlet port 206 and an outlet port 208. The inlet port 206 is operatively disposed between the pump 84 and the fluid channel 220, and operative to allow passage of the cooling fluid 90 into the enclosure 30 toward the fluid channel 220. The outlet port 208 is operatively disposed between the fluid channel 220 and the heat exchanger 83, and operative to allow passage of the cooling fluid 90 out of the enclosure 30 toward the heat exchanger 83.

For the FIG. 8 arrangement, the heat flow for dissipating heat from the outer race 54 is from the outer race 54, to the bearing block 58, then to the cooling fluid 90 in the fluid channel 220, then to external to the CMG 10 via the heat exchanger 83. Note that the heat is transferred by solid conduction from the outer race 54 to the bearing block 58, then by solid conduction through the bearing block 58, then by conduction and convection to the cooling fluid 90.

Figure 10:
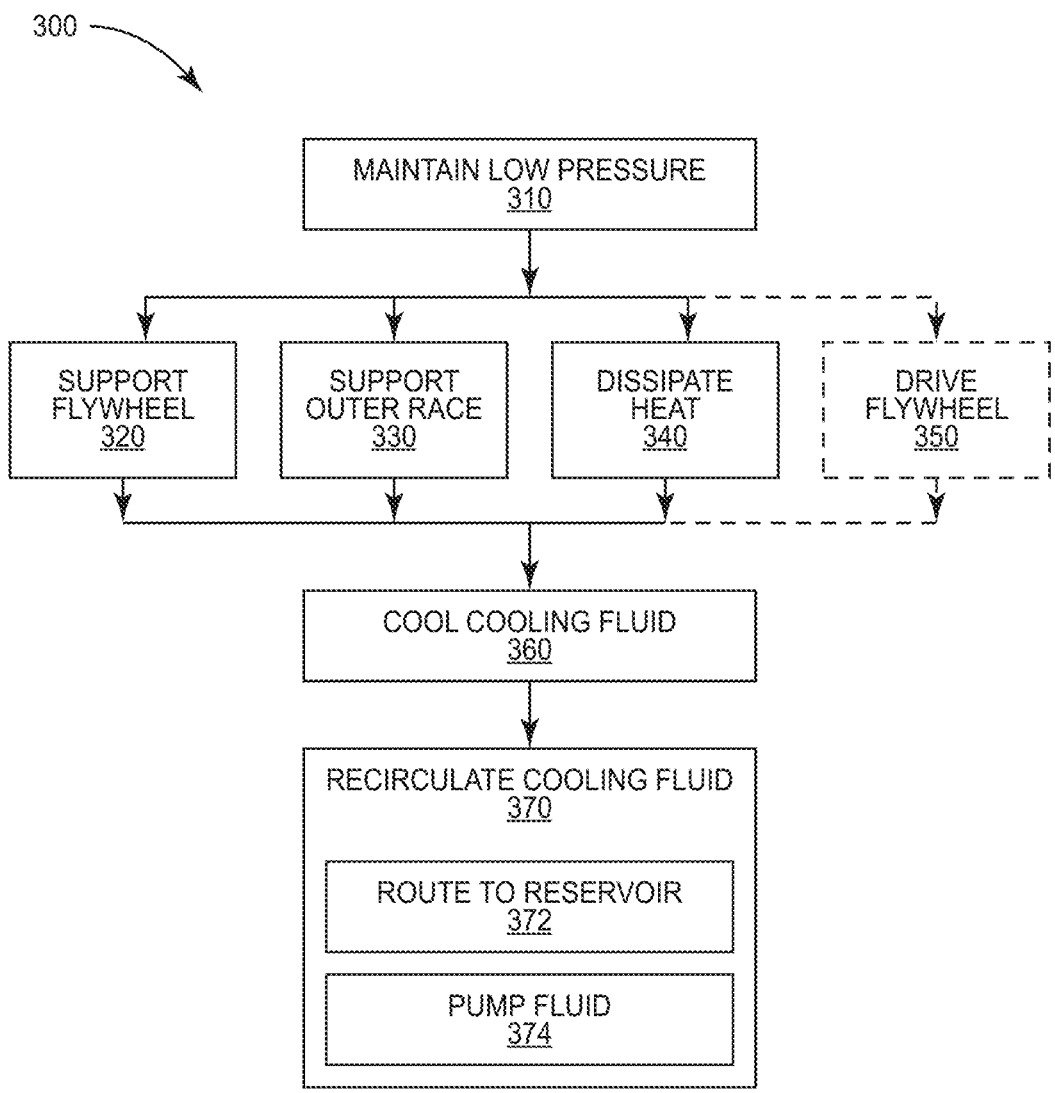
FIG. 10 shows a simplified flowchart of an exemplary method for cooling the outer race.

A method (300) of operating a gyroscopic roll stabilizer 10 that includes a bearing cooling circuit 100' for the outer race 54 of the bearing discussed above is shown in FIG. 10. The method (300) includes maintaining (310) a below ambient pressure within enclosure 30, with enclosure 30 surrounding flywheel assembly 40. The flywheel assembly 40 includes flywheel shaft 44 and spinning flywheel 42. The method also includes supporting (320) the spinning flywheel for rotation about flywheel axis F via bearing 50, the bearing 50 comprising inner race 52 and outer race 54, with the inner race 52 affixed to the flywheel shaft 44. The method further includes supporting (330) the outer race 54 via bearing block 58 disposed between the outer race 54 and the enclosure 30 and configured to hold the outer race 54 rotationally fixed relative to the enclosure 30. The method also includes dissipating (340) heat from the outer race 54 by transferring the heat by conduction and convection to a cooling fluid 90 flowing through fluid channel 220 disposed between bearing block 58 and enclosure 30. Further, the method includes cooling (360) the cooling fluid 90 by removing heat from the cooling fluid 90 external to the portion of the enclosure 30 maintained at the below-ambient pressure. In addition, the method includes recirculating (370) the cooling fluid 90 through closed fluid pathway 210 that includes the fluid channel 220. Note that the recirculating (370) optionally includes routing (372) the cooling fluid 90 from the fluid channel 220 to reservoir 82, and pumping (374) the cooling fluid 90 from the reservoir 82 to the fluid channel 220, and the cooling (360) the cooling fluid 90 comprises cooling the cooling fluid 90 via a heat exchanger 83 disposed external to the enclosure 30. Optionally, the operating method includes driving (350) the flywheel 42 to spin about flywheel axis F via motor 60 disposed internal to the enclosure 30. Note that the various steps of method (300) may be carried out in any suitable order, including in whole or in part in parallel. For example, at least the maintaining (310), the supporting (320) the flywheel, the supporting (330) the outer race, and the dissipating (340) are advantageously carried out simultaneously.

Referring again to FIG. 8, the CMG 10 alternatively and/or additionally includes an arrangement for dissipating heat from the inner race 52. In this regard, the flywheel shaft 44 includes open-ended cavity 46 formed in an end of the flywheel shaft 44. A liquid heat transfer medium 122 is disposed in cavity 46. The liquid heat transfer medium 122 may be any suitable material for operating in the low-pressure environment of the enclosure 30. For example, the liquid heat transfer medium 122 may be hydrocarbon oils (alkylated aromatics as well as alkanes, paraffinic mineral oils, and other synthetic hydrocarbons), fluorocarbon oils (such as PFPE), silicone fluids of various chain lengths (e.g., polydimethylsiloxane (PDMS)), glycol mixtures, and combinations thereof. The liquid heat transfer medium 122 is held in cavity 46 by one or more suitable seals 125. Note that the inner race 52 is affixed to the flywheel shaft 44 proximate cavity 46.

Figure 11:
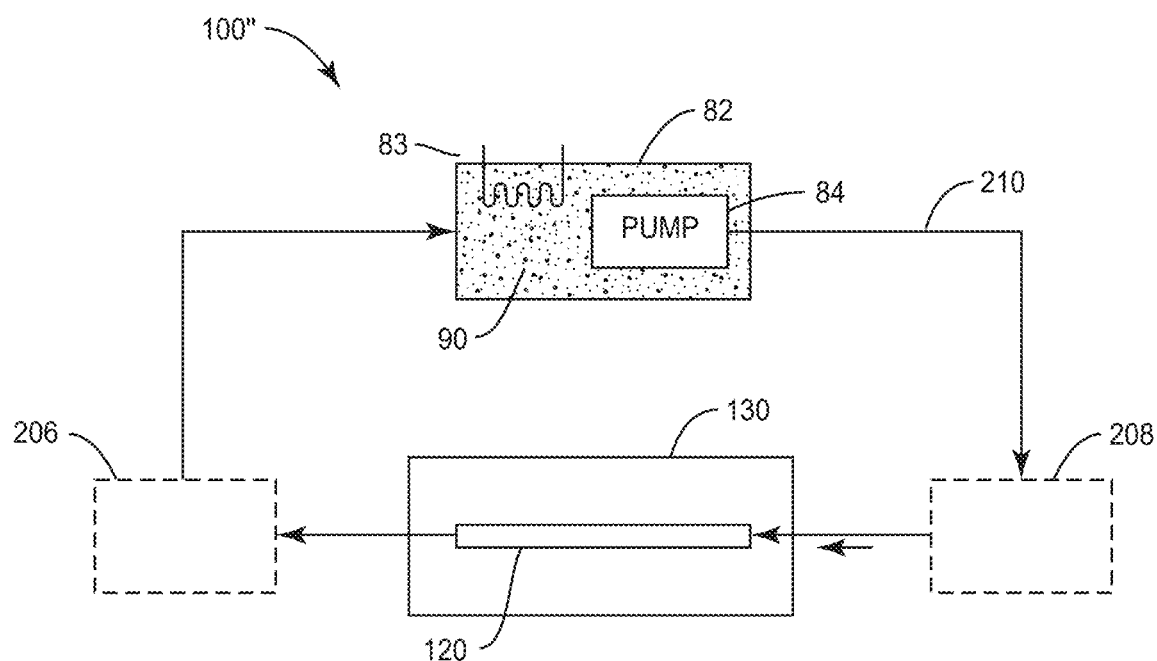
FIG. 11 shows a simplified schematic of a bearing cooling circuit for cooling the inner race.

A bearing cooling circuit 100" is configured to transfer heat away from the inner race 52 of the by recirculating cooling fluid 90. See FIG. 11. As with bearing cooling circuit 100', the cooling fluid 90 in bearing cooling circuit 100" may be any suitable fluid, with a liquid such as glycol and/or glycol mixtures being particular examples. Bearing cooling circuit 100" includes a heat transfer shaft assembly 130 rotationally fixed relative to the flywheel axis F and extending from the enclosure 30 into cavity 46 so as to contact liquid heat transfer medium 122. The bearing cooling circuit 100" also includes a closed fluid pathway 210 for the cooling fluid 90 that extends through the heat transfer shaft assembly 130 to internally cool the heat transfer shaft assembly 130. The CMG 10 is configured to transfer heat away from the inner race 52 to the flywheel shaft 44, and from the flywheel shaft 44 to the liquid heat transfer medium 122, and from the liquid heat transfer medium 122 to the heat transfer shaft assembly 130, and from the heat transfer shaft assembly 130 to the cooling fluid 90. Note that the cavity 46 is wider (in the horizontal direction of FIG. 8) than the corresponding section of the heat transfer shaft assembly 130. Thus, the heat transfer assembly 130 and the inner wall of the cavity 46, assuming both are round in cross-section, are annularly spaced from one another by a gap, and the liquid heat transfer medium 122 is disposed in this gap. Optimal sizing of this gap may depend on the viscosity, heat transfer, and other characteristics of the heat transfer medium 122, which impact the viscous drag and/or corresponding heat generation of the heat transfer medium 122. In some aspects, this gap is advantageously in the range of about one half to one and a half inches.

In some aspects, the heat transfer shaft assembly 130 is a simple unified shaft that includes an internal chamber for the cooling fluid to be circulated through. In other aspects, the heat transfer shaft assembly 130 includes a shaft 131, a sleeve 136, and fluid channel 120. The shaft 131 extends from the enclosure 30 and into cavity 46. The shaft 131 advantageously has outer groove(s) 132 and an inner passage 134. As with groove(s) 222, groove(s) 132 may be oriented perpendicular to the flywheel axis F, or may advantageously spiral around the flywheel axis F, such as by being helical or other spiral shape. Alternatively, groove(s) 132 may wind around the shaft 131 in any suitable fashion, such as in a sinusoidal shape, or a zig-zag shape, whether regular or irregular. Advantageously, the groove(s) 132 peripherally surround the flywheel axis F, such as by circumnavigating the shaft 131. The sleeve 136 is disposed about the shaft 131 in spaced relation to the "floor" of the groove(s) 132 and in spaced relation to an inner wall on flywheel shaft 44 defining the cavity 46. For example, as shown in FIG. 8, the sleeve 136 disposed about the shaft 131 so as to overlap the groove(s) 132 and is disposed in spaced relation to an inner wall defining the cavity 46. A fluid channel 120 is jointly defined by the sleeve 136 and the groove(s) 132, with the fluid channel 120 having the cooling fluid 90 therein. The closed fluid pathway 210 extends through fluid channel 120.

Note that in alternative embodiments, the groove(s) 132 are alternatively and/or additionally formed on the sleeve 136. Thus, it should be considered that the fluid channel 120 is jointly formed by the shaft 131 and sleeve 136, regardless of whether the groove(s) 132 are in the shaft 131, or the sleeve 136, or both.

In some aspects, the bearing cooling circuit 100" further includes a pump 84 and a heat exchanger 83. The pump 84 is operatively connected to the fluid channel 120 and configured to recirculate the cooling fluid 90 through the fluid channel 120 to remove heat from the inner race 52 via the flywheel shaft 44, the liquid heat transfer medium 122, and heat transfer shaft assembly 130. The heat exchanger 83 is operatively connected to the closed fluid pathway 210 and configured to remove heat from the cooling fluid 90 to ambient after the cooling fluid 90 has passed through fluid channel 120.

Cooling fluid 90 flows through the bearing cooling circuit 100", including the fluid channel 120. When shaft 131 with inner passage 134 is present, the inner passage 134 may be downstream relative to the fluid channel 120 along the fluid pathway 210, so that cooling fluid 90 flows through the fluid channel 120, and then out of the heat transfer shaft assembly 130 via the inner passage 134. In other aspects, the flow is reversed so that cooling fluid 90 flows through the inner passage 134, and then out of the heat transfer shaft assembly 130 via the fluid channel 120.

For the FIG. 8 arrangement, the heat flow for dissipating heat from the inner race 52 is from the inner race 52, to the flywheel shaft 44, then to the liquid heat transfer medium 122, then to the heat transfer shaft assembly 130, then to the cooling fluid 90, typically then to external to the CMG 10 via the heat exchanger 83. Note that the heat is transferred by solid conduction from the inner race 52 to the flywheel shaft 44, then by conduction and convection to the liquid heat transfer medium 122, then by conduction and convection to the heat transfer shaft assembly 130, then by conduction and convection to the cooling fluid 90.

Figure 12:
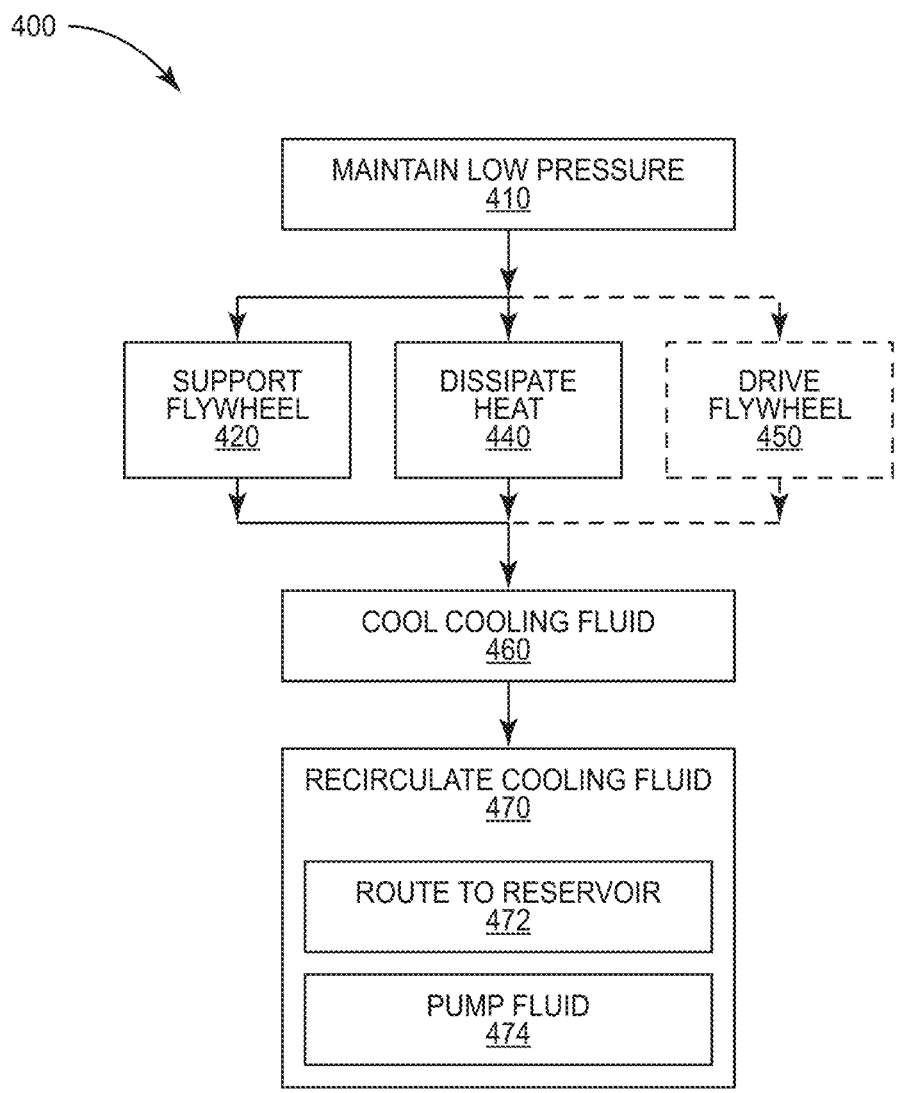
FIG. 12 shows a simplified flowchart of an exemplary method for cooling the inner race.

A method (400) of operating a gyroscopic roll stabilizer that includes a bearing cooling circuit 100" for the outer race 54 of the bearing discussed above is shown in FIG. 12. The method (400) includes maintaining (410) a below ambient pressure within enclosure 30, with the enclosure 30 surrounding flywheel assembly 40. The flywheel assembly 40 includes a flywheel shaft 44 and a spinning flywheel 42. The flywheel shaft 44 has an open-ended cavity 46 formed in an end of the flywheel shaft 44. A liquid heat transfer medium 122 is disposed in the cavity 46. The method also includes supporting (420) the spinning flywheel for rotation about flywheel axis F via bearing 50, the bearing 50 having inner race 52 and outer race 54, with the inner race 52 affixed to the flywheel shaft 44. The method further includes dissipating (440) heat from the inner race 52 by transferring the heat by conduction and convection to bearing cooling circuit 100" configured to transfer heat by recirculating cooling fluid 90 along closed fluid pathway 210. The dissipating heat comprises internally cooling, by the cooling fluid 90, heat transfer shaft assembly 130 rotationally fixed relative to the flywheel axis and extending from the enclosure 30 into the cavity 46 so as to contact the liquid heat transfer medium 122. In some aspects, the heat transfer shaft assembly 130 includes a shaft 131 and a sleeve 136, as described above, with the fluid channel 120, and the closed fluid pathway 210 extends through the fluid channel 120. Further, the method includes cooling (460) the cooling fluid 90 by removing heat from the cooling fluid 90 external to the portion of the enclosure 30 maintained at the below-ambient pressure. In addition, the method includes recirculating (470) the cooling fluid 90 through closed fluid pathway 210. Note that the recirculating (470) optionally includes routing (472) the cooling fluid 90 from the heat transfer shaft assembly 130 to reservoir 82, and pumping (474) the cooling fluid 90 from the reservoir 82 to the heat transfer shaft assembly 130, and the cooling (460) the cooling fluid 90 comprises cooling the cooling fluid 90 via a heat exchanger 83 disposed external to the enclosure 30. Optionally, the operating method includes driving (450) the flywheel 42 to spin about flywheel axis F via motor 60 disposed internal to the enclosure 30. In the method, heat is transferred away from the inner race 52 of bearing to the flywheel shaft 44, and from the flywheel shaft 44 to the liquid heat transfer medium 122, and from the liquid heat transfer medium 122 to the heat transfer shaft assembly 130, and from the heat transfer shaft assembly 130 to the cooling fluid 90. Note that the various steps of method (400) may be carried out in any suitable order, including in whole or in part in parallel. For example, at least the maintaining (410), the supporting (420) the flywheel, and the dissipating (440) are advantageously carried out simultaneously.

Note that the discussion above has generally been in the context of a given end of the flywheel assembly 40 being rotationally supported in the enclosure 30 by a single bearing 50. However, it should be noted that one or both ends (e.g., just north end, just south end, or both north and south ends) of the flywheel shaft 42 may alternatively be supported by a corresponding plurality of bearings 50, such as two or more stacked bearings 50 at one or both ends.

Further note that while not required, the CMG 10 advantageously includes both bearing cooling circuit 100' and bearing cooling circuit 100" (instead of just one or the other) so that heat is efficiently transferred away from both the inner race 52 and the outer race 54. In some embodiments, bearing cooling circuit 100' and bearing cooling circuit 100" share a common reservoir 82 and heat exchanger 84 (and optionally inlet port 206, and outlet port 208), so as to form a meta-circuit that shares cooling fluid 90 between fluid channel 220 and the heat transfer shaft assembly 130. For example, the fluid channel 220 and the heat transfer shaft assembly 130 may be disposed along a common bearing cooling circuit 100, such that the fluid channel 220 is disposed in series with and downstream/upstream of the heat transfer shaft assembly 130 (and fluid channel 120), before/after the common reservoir 82, in a bearing cooling circuit 100 that cools both the inner race 52 and the outer race 54.

The bearing cooling systems 100 (which may be alternatively denoted 100' or 100") as herein described allow much greater heat dissipation compared to current technology, which enables use of a larger motor 60, and advantageously lower operating temperature even with the larger motor 60. The larger motor and lower operating temperature enable rapid spin up and spin down of the flywheel assembly 40, and a significantly lower time to engage as discussed further below.

In use, the gimbal 20 is normally locked during spin up, i.e., while the flywheel assembly 40 is being accelerated, to prevent precession of the flywheel 42 until a predetermined rotational speed is achieved. The CMG 10 can be locked to prevent rotation of the enclosure 30 by the active braking system 78. When the CMG 10 is unlocked, precession of the flywheel 42 will place side loads on the bearings 50. The bearing friction from the side loading of the bearings 50 generates heat. In addition, the bearing friction from the side loading also adds drag, which must be overcome by the motor 60 in order to continue acceleration of the flywheel's rotation. Thus, the frictional losses of side loading the bearings 50 have two impacts: generating heat and increasing the load on the motor 60.

Conceptually, there are two main sources of heat in a CMG: heat generated by the motor inside the enclosure 30 and heat generated by bearing friction. A large percentage of the heat budget is needed to dissipate heat from the bearings in order to prevent bearing failure. The remaining portion of the heat budget, after accounting for bearing cooling, determines the size of the motor that can be used inside the enclosure.

The bearing cooling systems 100 as described herein enable more efficient heat transfer, which enables a far greater heat transfer capacity and an increased heat budget. The increased heat budget means that larger and more powerful motors 60 that generate more heat can be used without causing bearing failure. With a larger and more powerful motor 60, the improved CMG 10 of the present disclosure is able to achieve greater acceleration of the flywheel assembly 40 and lower time to engage than a conventional CMG. In addition to the higher rates of acceleration, which naturally lead to lower times to engage assuming the same minimum operating speed, a larger motor 60 enables the flywheel assembly 40 to be engaged at a lower operating speed (e.g., a lower percentage of nominal operating speed), which further reduces the time to engage, because the larger motor 60 is able to overcome the additional friction from the loading of the bearings 50. In some embodiments, the motor 60 is configured to enable the CMG 10 to be unlocked in under twenty minutes, and preferably in under ten minutes and more preferably in under five minutes. By combining higher acceleration with lower operating speeds at the time of engagement, a time to engage can be reduced to a few minutes. The rapid spin up and shorter time to engage enables beneficial use of the CMG 10 even for short trip times, which makes up a majority of boating trips. Thus, the rapid spin-up enables the CMG 10 to be used on a greater number of boating occasions.

The disclosure of U.S. Patent Application Publication No. US20200317308 is incorporated herein by reference in its entirety.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A gyroscopic roll stabilizer for a boat, the gyroscopic roll stabilizer comprising:
an enclosure mounted to a gimbal for rotation about a gimbal axis and configured to maintain a below-ambient pressure;
a flywheel assembly including a flywheel and a flywheel shaft with an open-ended bore bounded by an inner wall;
a bearing for rotatably mounting the flywheel assembly inside the enclosure for rotation about a flywheel axis;
a motor operative to rotate the flywheel assembly;
a heat transfer shaft rotationally fixed relative to the flywheel axis and extending from the enclosure into the open-ended bore, wherein the heat transfer shaft functions as a heat sink to absorb heat generated by the bearing; and
a cooling circuit extending into the heat transfer shaft for recirculating liquid coolant through the heat transfer shaft to remove heat absorbed by the heat transfer shaft.

2. The gyroscopic roll stabilizer of claim 1, wherein the heat transfer shaft includes an internal chamber through which the liquid coolant circulates.

3. The gyroscopic roll stabilizer of claim 1, further comprising a gap between the heat transfer shaft and the inner wall of the open-ended bore.

4. The gyroscopic roll stabilizer of claim 2, wherein the cooling circuit further comprises:
a fluid pump to recirculate the liquid coolant through the heat transfer shaft; and
a heat exchanger external to the enclosure to remove heat from the liquid coolant.

5. A method of dissipating heat from a gyroscopic roll stabilizer for a boat, the method comprising:
maintaining a below ambient pressure within an enclosure surrounding a flywheel assembly, the flywheel assembly including a flywheel shaft and a spinning flywheel and mounted for rotation inside the enclosure by a bearing, wherein the flywheel shaft has an open-ended bore;
transferring heat generated by the bearing to a heat transfer shaft extending from the enclosure into the open-ended bore in the flywheel shaft; and
removing the heat generated by the bearing from the enclosure by circulating a liquid coolant through an internal chamber in the heat transfer shaft assembly.

6. A gyroscopic roll stabilizer for a boat, comprising:
an enclosure mounted to a gimbal for rotation about a gimbal axis and configured to maintain a below-ambient pressure;
a flywheel assembly including a flywheel and a flywheel shaft with an opening formed in an end of the flywheel shaft;
a bearing rotatably mounting the flywheel assembly inside the enclosure for rotation about a flywheel axis;
a motor operative to rotate the flywheel assembly;
a heat transfer shaft assembly rotationally fixed relative to the flywheel axis and the enclosure and extending into the opening in the flywheel shaft to enable transfer of heat generated by the bearing to the heat transfer shaft assembly; and
a cooling circuit extending into the heat transfer shaft assembly at least as far as the bearing and configured to circulate a coolant through the heat transfer shaft assembly to remove the heat generated by the bearing from the enclosure.

7. The gyroscopic roll stabilizer of claim 6:
wherein the heat transfer shaft includes a first central longitudinal bore that forms a portion of the cooling circuit;
wherein the coolant is routed through the first central longitudinal bore.

8. The gyroscopic roll stabilizer of claim 7, wherein the first central longitudinal bore, the bearing, and the flywheel shaft longitudinally overlap each other.

9. The gyroscopic roll stabilizer of claim 7:
wherein the bearing is a first bearing;
wherein the first bearing is disposed proximate a first end of the flywheel shaft;
wherein the gyroscopic roll stabilizer further comprises:
a second bearing disposed proximate a second end of the flywheel shaft is spaced relation to the first bearing;
a second central longitudinal bore extending at least as far as the second bearing;
wherein the cooling circuit extends into the second end of the flywheel shaft and is configured to circulate a coolant through the second longitudinal bore to remove heat generated by the second bearing from the enclosure.

10. The gyroscopic roll stabilizer of claim 6, wherein the heat transfer shaft assembly is spaced from the flywheel shaft by a gap with the flywheel assembly configured to rotate relative to the heat transfer shaft assembly.

11. The gyroscopic roll stabilizer of claim 6, wherein the heat transfer shaft assembly comprises:
a shaft having an outer groove and an inner passage;
a sleeve disposed about the shaft so as to overlap the groove;
a fluid channel jointly formed by the sleeve and the groove, the fluid channel having the coolant therein.

12. A method of dissipating heat from a gyroscopic roll stabilizer for a boat, the method comprising:
maintaining a below ambient pressure within an enclosure surrounding a flywheel assembly; the flywheel assembly including a flywheel shaft and a spinning flywheel and mounted for rotation inside the enclosure about a flywheel axis by a bearing; wherein the flywheel shaft has an opening formed in an end of the flywheel shaft;
transferring heat generated by the bearing to a heat transfer shaft assembly; the heat transfer shaft assembly rotationally fixed relative to the flywheel axis and the enclosure and extending into the opening in the flywheel shaft to enable transfer of heat generated by the bearing to the heat transfer shaft assembly; and
removing the heat generated by the bearing from the enclosure by circulating a coolant through a cooling circuit extending into the heat transfer shaft assembly at least as far as the bearing.

13. The method of claim 12:
wherein the heat transfer shaft assembly includes a first central longitudinal bore that forms a portion of the cooling circuit;
wherein the removing heat comprises circulating the coolant through the first central longitudinal bore.

14. The method of claim 13, wherein the first central longitudinal bore, the bearing, and the flywheel shaft longitudinally overlap each other.

15. The method of claim 12:
wherein the bearing is a first bearing disposed proximate a first end of the flywheel shaft;
wherein the gyroscopic roll stabilizer further comprises:
- a second bearing disposed proximate a second end of the flywheel shaft is spaced relation to the first bearing;
- a second central longitudinal bore extending at least as far as the second bearing;

wherein the cooling circuit extends into the second end of the flywheel shaft;
wherein the removing heat further comprises removing heat generated by the second bearing from the enclosure by circulating the coolant through the second central longitudinal bore.

16. The method of claim 12, wherein the heat transfer shaft assembly is spaced from the flywheel shaft by a gap; wherein the method further comprises rotating the flywheel assembly relative to the heat transfer shaft assembly via a motor.

17. The method of claim 12:
wherein the heat transfer shaft assembly comprises:
- a shaft extending through the opening in the flywheel shaft and having an outer groove and an inner passage;
- a sleeve disposed about the shaft so as to overlap the groove; and
- a fluid channel jointly formed by the sleeve and the groove; wherein the fluid channel forms a portion of the cooling circuit;

wherein the removing the heat comprises circulating the coolant through the fluid channel.

\* \* \* \* \*